Patented Feb. 13, 1951

2,541,568

UNITED STATES PATENT OFFICE 2,541,568

NONCURDING HIGH CALCIUM MILK PRODUCT AND METHOD OF PRODUCING SAME

Lorenz S. Baur and Marian Patricia Gerber, Columbus, Ohio, assignors to M & R Dietetic Laboratories, Inc., Columbus, Ohio, a corporation of Ohio No Drawing. Application December 16, 1947,
Serial No. 792,098

18 Claims. (Cl. 99—54)

The present invention relates to improvements in the treatment of milk or milk products, and more particularly to the treatment of milk to produce non-curding milk or milk products having a calcium to phosphorus ratio considerably in excess of the calcium to phosphorus ratio in normal untreated cow's milk, or in processed milk, such as that known as soft-curd milk or milk products.

The expression "normal cow's milk" as used throughout the following specification and claims is intended to have the same meaning as it does throughout the dairy industry, namely "legal" milk, or the natural milk of one or more cows obtained by the complete milking of healthy cows, excluding any milk obtained within fifteen days before and five days after calving or such longer period as may be necessary to render the milk practically colostrum-free.

The primary objection to natural cow's milk over that of human milk for infant feeding arises from the fact that most normal milk of a single cow and normal mixed cow's milk, as distributed in the fluid milk market, forms tough hard curds in the stomachs of infants, whereas human milk forms soft flocculent curds that are known to be more easily digestible. The reasons why normal cow's milk forms tough hard curds in the infant's stomach are not fully known nor fully understood. It is known, however, that the addition of small amounts of various forms of soluble phosphates, such as the sodium salts of these phosphates, reduces the tendency toward hard curd formation whereas the addition of small quantities of soluble calcium salts, such as calcium chloride, increases the tendency to form tough hard curds. Considering the difference in ratio of calcium to phosphorus in normal cow's milk and the average human milk, it will be found that the calcium to phosphorus ratio of normal cow's milk is of the approximate order of from 1.2 to 1.0, to 1.3 to 1.0, whereas the calcium to phosphorus ratio of human milk is of the approximate order of from 2.0 to 1.0, to 2.5 to 1.0. Considering the difference in ratio of sodium to potassium in normal cow's milk and human milk, it will be found that the sodium to potassium ratio of normal cow's milk is of the approximate order of 0.4 to 1.0 whereas the sodium to potassium ratio in human milk is of the approximate order of 0.2 to 1.0. It is, therefore, desirable to maintain in the milk, especially that prepared for infant feeding, a calcium to phosphorus ratio which is higher than that of normal cow's milk, and which approximates the calcium to phosphorus ratio of human milk, while at the same time having in this especially prepared milk the property of soft curd, or non-curd formation. It is also desirable to maintain in a milk product prepared especially for infant feeding a sodium to potassium ratio that is lower than that of normal cow's milk and which approximates the sodium to potassium ratio of human milk.

Hitherto, a number of methods or processes have been suggested or devised for imparting to normal cow's milk so-called soft-curd properties. One particular method set forth involves the removal of a portion of the calcium ions present in natural cow's milk, and the substitution therefor of relatively soluble alkali metal ions, such as sodium or potassium. This method is commonly referred to as an ionic exchange process. Another method for producing soft-curd milk or milk products involves the removal of portions of both calcium and phosphorus, but the calcium is removed to a greater extent than the phosphorus, thereby decreasing rather than increasing the calcium to phosphorus ratio of the resultant product. This method is commonly known as a base exchange process. Still another method involves the treatment of milk with an alkali metal metaphosphate. It will be observed that all of these methods result in reducing rather than increasing the ratio of calcium to phosphorus over that of normal cow's milk. It follows, therefore, that if it is desired to produce a non-curd forming product from cow's milk and at the same time increase the calcium to phosphorus ratio of the resultant product to approximate that of human milk, it is necessary to supplement, rather than decrease, the calcium content within cow's milk without increasing the phosphorus content thereof.

Accordingly, it is the primary objective of the present invention to provide a non-curd forming milk or milk product having an increased calcium to phosphorus ratio over that of normal cow's milk and which more closely approximates that of human milk.

It is another object of this invention to provide new and useful methods for the preparation of a non-curding milk product, having an increased calcium to phosphorus ratio, such methods being adaptable to large scale or commercial operations and characterized by their efficiency, economy, and expeditious execution.

Still another objective of the present invention is to provide improved methods for producing from normal cow's milk a milk product having a decreased sodium to potassium ratio as well as an increased calcium to phosphorus ratio and the property of non-curd formation.

It is still a further object of the present invention to provide improved methods for the production of a soft-curd, or non-curd forming, milk product having a high calcium to phosphorus ratio which consist in treating whole, partially skimmed, or skimmed cow's milk separately with a quantity of an alkali metal citrate, and an edible calcium-bearing compound, or with a quantity of an alkali metal hydroxide, citric acid, an alkali metal citrate, and a calcium-bearing compound; the citrate ions functioning to destroy the curd-forming properties in natural cow's milk, while the calcium-bearing compound functions to supplement the normal calcium content of the milk in order to increase the calcium to phosphorus ratio therein.

In the practice of the present invention, it has been found that in treating a known quantity of skimmed cow's milk with a known quantity of an alkali metal citrate, such as trisodium or tripotassium citrate, and with an edible calcium-bearing compound such as calcium gluconate, calcium lactate, or calcium chloride, the normal curd-forming properties of the milk may be completely destroyed, and at the same time the calcium to phosphorus ratio of the milk is considerably increased over that of natural cow's milk.

For example, a 500-ml. batch of skimmed cow's milk when separately treated with 3.68 grams of trisodium citrate dihydrate and 3.23 grams of anhydrous calcium gluconate, resulted in a pleasing and edible milk product having a pH value of 6.76, and a calcium to phosphorus ratio of 1.79 in contradistinction to a calcium to phosphorus ratio of about 1.22 in the original milk. Further, the resultant milk product, when analyzed and tested for curd formation by the official hydrochloric acid-pepsin method of The American Dairy Science Association was found to be free of curd-forming properties, whereas the normal curd-forming properties within the original batch of cow's milk were tested by the same method and were found to be at a maximum value.

It has further been found, that the amount of alkali metal citrate necessary to completely destroy the curd-forming properties of milk, is not only directly proportional to the quantity of milk treated, but is also directly proportional to the quantity of the calcium-bearing compound used to increase the calcium to phosphorus ratio within the resultant milk product.

In a particular experiment, 2.94, 3.68, 4.41 and 5.15 grams of trisodium citrate dihydrate were added respectively to four 500-ml. aliquots of a batch of skimmed milk and, thereafter, to each of the aliquots were added 4.30 grams of anhydrous calcium gluconate. The amount of calcium gluconate added was sufficient to raise the calcium to phosphorus ratio to 2.07 as contrasted to a calcium to phosphorus ratio of 1.29 in the original milk. The hardness of the curd in the samples containing 2.94 grams and 3.68 grams of trisodium citrate dihydrate was definitely less than that of the original milk when tested by the official method mentioned herein. The aliquots containing 4.41 grams and 5.15 grams of trisodium citrate dihydrate were completely free of curd formation when tested by the same method. In still another experiment, it was found that 5.88 grams of trisodium citrate dihydrate in 500-ml. of skimmed milk were necessary to completely destroy the curd-forming properties when the calcium to phosphorus ratio was raised from 1.18 in the original milk to 2.33 by the addition of calcium gluconate.

It is evident from these data that the curd-forming properties of milk may be completely destroyed by treatment with trisodium citrate even though the calcium to phosphorus ratio is raised to as high as 2.33 by the addition of calcium gluconate. It will also be seen that the amount of trisodium citrate necessary to completely destroy the curd-forming properties of the milk must be increased as the amount of calcium gluconate is increased.

In various experiments, the minimum amount of citrate ions, when added as alkali metal citrates, required to completely destroy the curd-forming properties in 500-ml. of skimmed milk was found to be 0.945 gram when no calcium was added, 1.891 grams when 0.200 gram of calcium was added, 2.367 grams when 0.301 gram of calcium was added, 2.836 grams when 0.400 gram of calcium was added, and 3.781 grams when 0.601 gram of calcium was added. The basic need of normal skimmed milk to destroy the curd-forming properties is 0.945 gram of citrate ions per 500-ml. of milk. The required amount of citrate ions to take care of the added calcium, therefore, is found by subtracting 0.945 from the total grams of citrate ions used in each case. These values are 0.946 for .200 gram of calcium, 1.422 for 0.301 gram of calcium, 1.891 for 0.400 gram of calcium and 2.836 for 0.601 gram of calcium. These values when converted into ratios are as follows:

$$\frac{0.946}{.200} = 4.73$$

$$\frac{1.422}{0.301} = 4.72$$

$$\frac{1.891}{0.400} = 4.73$$

$$\frac{2.836}{0.601} = 4.72$$

Thus it will be seen from these data that there is an exact mathematical relationship between the amount of calcium added and the amount of citrate ions needed over and above that required for the normal milk to completely destroy curd formation. In other words, for each gram of calcium added to the milk about 4.72 grams of citrate ions are required. As expressed in percentages by weight, the amount of citrate ions required to completely destroy the curd-forming properties within a given quantity of skimmed milk which is supplemented with a known quantity of calcium is equal to 0.183 per cent by weight of the milk plus 472 per cent by weight of the calcium added thereto. More specifically, when trisodium citrate dihydrate and anhydrous calcium gluconate are used as the sources of citrate ions and calcium ions, respectively, the amount of trisodium citrate dihydrate required to completely destroy the curd-forming properties within a given quantity of skimmed milk which is supplemented with a known quantity of anhydrous calcium gluconate is equal to 0.285 per cent by weight of the milk plus 68 per cent by weight of the calcium gluconate added thereto.

It has been found that by treating skimmed milk with an alkali metal hydroxide, such as sodium hydroxide or potassium hydroxide, to raise the pH, and with an alkali metal citrate, such as trisodium citrate or tripotassium citrate, and a calcium-bearing compound, such as calcium gluconate, calcium lactate, calcium chloride, and the like, that less alkali metal citrate is required to completely destroy the curd-forming properties in the milk containing added calcium-bearing compounds, than is required if no alkali metal hydroxide is added. In a particular experiment 2.21 grams of trisodium citrate dihydrate were added to each of five 500-ml. samples of skimmed milk, and in turn, enough sodium hydroxide was added to raise the pH in the samples respectively to 9.50, 9.73, 10.00, 10.12 and 10.23. Thereafter, 2.15 grams of anhydrous calcium gluconate were added to each of the samples which amount was sufficient to raise the calcium to phosphorus ratio to 1.73 from a calcium to phosphorus ratio in the original sample of 1.32. The pH of the original milk was 6.68. After reducing the pH of each of the five samples to about 6.68 by the addition of hydrochloric acid the official curd formation test was applied to each. The curd that formed in the sample in which the pH was raised to 9.50 was very soft and flocculent whereas no curd at all formed in the other four samples. An untreated control sample formed a very hard curd. A 500-ml. sample containing no added sodium hydroxide, but containing 2.15 grams of anhydrous calcium gluconate required 2.94 grams of trisodium citrate dihydrate to completely destroy the curd-forming properties of this milk in contrast to 2.21 grams when the pH was raised to about 9.7 or higher.

The results, as expressed in the above data, show that the use of sodium hydroxide to raise the pH value of the milk is an aid in producing a non-curd forming milk containing added calcium gluconate when less than the minimum quantity of trisodium citrate is used. Further experiments indicate that the use of sodium hydroxide not in conjunction with trisodium citrate will reduce the curd-forming property of the milk, but will not completely destroy it even though enough sodium hydroxide is added to raise the pH value of the milk to approximately 10.5.

From the immediately preceding data, it will be seen that the pH value of the resultant liquid milk products, after the addition of sodium hydroxide, was greatly increased, and due to the relatively high pH value, it became necessary to reduce the pH value of the resultant product within a range approximating the normal pH value of natural fresh cow's milk if the product was to be used for human food purposes. To accomplish this decrease in pH value a suitable acid, such as hydrochloric acid, citric acid, or the like, preferably citric acid, may be added to the liquid product in quantities sufficient to reduce the pH value to the desired range.

In a particular experiment sufficient sodium hydroxide was added to three separate, but like, 500-ml. batches of skimmed milk to raise the pH respectively to 9.50, 9.75 and 10.02. To each of these three batches of skimmed milk and to a fourth batch of like quantity, but containing no added sodium hydroxide, were added 2.15 grams of anhydrous calcium gluconate. To the first three batches of the treated skimmed milk was added enough citric acid to reduce the pH of each to about 6.5. To the first batch were added 1.68 grams, to the second batch 1.47 grams, and to the third batch 1.21 grams of trisodium citrate dihydrate. The pH of each of these batches thereby was raised to about 6.68 which was the pH of the original milk. Trisodium citrate dihydrate was also added to the fourth batch of milk. The total amount of citrate ions added to each of the batches was approximately the same and amounted to about 1.89 grams. Upon testing each of the batches for curd formation by the official method, it was found that the curd-forming properties in each had been completely destroyed whereas the curd formed in the batch of the same milk containing no added calcium gluconate nor citrate ions was very hard and firm.

The results of the above experiment demonstrate that the same results are obtained by this method as are accomplished by adding all of the citrate in the form of an alkali metal citrate. Other experiments conducted show that by raising the pH to 10.0 or higher with sodium hydroxide, adding the calcium gluconate, and reducing the pH to approximately 6.6 with citric acid did not give enough citrate ions to completely destroy the curd-forming properties of the milk. Consequently, it has been found necessary to add additional citrate ions in the form of an alkali metal citrate.

The following is an example demonstrating the utility and efficiency of the present invention in greatly increasing the calcium to phosphorus ratio of the non-curding milk product to within a range comparable to that found in many human milks having a high calcium to phosphorus ratio. In a particular experiment, enough sodium hydroxide was added to 500-ml. of skimmed milk held at 37° F. to raise the pH to about 10. Then 6.46 grams of anhydrous calcium gluconate were added and this was followed by the addition of 6.8 ml. of a molar citric acid solution which reduced the pH to 6.22. Finally 13.2 ml. of a molar solution of trisodium citrate were added which raised the pH to 6.63. The pH of the original milk was 6.60. The calcium to phosphorus ratio was determined and found to be 2.43. The product was tested and found to be non-curd forming.

As an alternative to the previously outlined methods, it has been found that calcium hydroxide may advantageously be used as the calcium-bearing compound in a process of this invention. Calcium hydroxide serves the double purpose of supplying calcium ions and of raising the pH of the milk to which it is added.

In a particular experiment trisodium citrate dihydrate was added to the milk containing enough added calcium hydroxide to raise the calcium to phosphorus ratio in the milk to about 1.6. The curd-forming properties of the milk were completely destroyed by this treatment. The pH value, however, was materially increased by this treatment making it necessary to reduce the pH within the range of normal fresh cow's milk by the addition of a suitable acid. In another experiment this was accomplished by adding sufficient calcium hydroxide to raise the calcium to phosphorus ratio in the milk to approximately 1.6, reducing the pH to about 6.5 with citric acid, and adding additional citrate ions in the form of trisodium citrate dihydrate. The curd-forming properties were destroyed when the total citrate ion concentration was 1.89 grams in 500 ml. of skimmed milk.

Further experiments have shown that the trisodium citrate may be added first to the milk followed by the addition of sodium hydroxide, a calcium-bearing compound, and citric acid so long as the total amount of citrate ions added is sufficient to destroy the curd-forming properties of the milk. Still another experiment shows that the calcium-bearing compound can be added to the milk ahead of the other chemicals without affecting the end results of the process.

It has further been found through various experiments that citric acid and an alkali metal citrate may be advantageously added in admixture to the milk after an alkakli metal hydroxide and a calcium-bearing compound have been added thereto, in order to accomplish the purposes of the invention. Likewise, the mixture of citric acid and alkali metal citrate may be added to the milk to which previously had been added calcium hydroxide. The mixture of citric acid and alkali metal citrate may be of such proportions that sufficient hydrogen ions are present to reduce the pH of the treated milk to the pH range of normal milk and that sufficient citrate ions are present to destroy the curd-forming properties of the milk.

In a particular example, enough calcium gluconate was added to a 500-ml. sample of skimmed milk, having a pH of 6.59, to raise the calcium to phosphorus ratio to about 1.6 and enough sodium hydroxide was added to raise the pH of the milk to about 10. After holding the treated milk for 30 minutes the pH had dropped slightly to 9.94 whereupon a mixture consisting of 6.9 ml. of molar citric acid solution and 3.1 ml. of molar trisodium citrate solution was added. The pH of the treated milk thereby was reduced to 6.60 (compared to a pH of 6.59 in the original milk) and the curd-forming properties were found to be completely destroyed when tested by the official method. In another particular example, enough calcium gluconate was added to a 500-ml. sample of skimmed milk, having a pH of 6.55, to raise the calcium to phosphorus ratio to about 2.4 and enough sodium hydroxide was added to raise the pH of the milk to about 10. After holding the treated milk for 30 minutes, the pH had dropped to 9.85 whereupon a mixture consisting of 6.3 ml. of molar citric acid solution and 13.7 ml. of molar trisodium citrate solution was added. The pH of the milk thereby was reduced to 6.72 and the curd-forming properties were found to be completely destroyed when tested by the official method.

It is obvious from the results of the foregoing experiments that the amount of citric acid present in the mixture of citric acid and alkali metal citrate is governed primarily by the pH to which the milk is taken by the addition of an alkali and that the amount of total citrate ions present in the mixture is governed primarily by the amount of calcium added to the milk. It is ad-advantageous to add the citric acid and alkali metal citrate in admixture, rather than separately, because thereby temporary coagulation of the milk protein, due to localized concentration of hydrogen ions, is greatly reduced and in some instances is completely eliminated.

Although trisodium citrate has been the principal citrate-bearing material used in most of the experiments described herein, it will be understood, and has been proven by experiment, that tripotassium citrate may be substituted on a molecularly equivalent basis, wholly or in part, wherever trisodium citrate is used in these processes. Likewise, potassium hydroxide may be substituted on a molecularly equivalent basis, wholly or in part, for sodium hydroxide wherever an alkali metal hydroxide is used in these processes. In a particular experiment, where tripotassium citrate was substituted entirely for trisodium citrate, the sodium to potassium ratio in the final product was lower than the average sodium to potassium ratio of human milk. In order to have in the finished product a sodium to potassium ratio approximating that of human milk it is preferred to use a mixture of trisodium citrate and tripotassium citrate. In a particular experiment where a mixture of the two forms of citrate was used the sodium to potassium ratio in the final product was about 0.32 to 1.0. It will be obvious to those skilled in the chemical art, that by using a mixture of trisodium citrate and tripotassium citrate in proper proportions to each other, a sodium to potassium ratio more nearly approximating the sodium to potassium ratio of human milk would be obtained in the final product.

While trisodium citrate and/or tripotassium citrate are preferred as the forms of an edible alkali metal citrate to be used in the processes of this invention, other forms of alkali metal citrates, such as monosodium dihydrogen citrate, disodium monohydrogen citrate, monopotassium dihydrogen citrate, and dipotassium monohydrogen citrate, may be used to accomplish the purposes of this invention. The addition of any of these alkali metal hydrogen citrates to milk lowers the pH of the milk. Consequently they can be used as an aid in reducing the pH if the pH of the product is higher than desired. Conversely, if by their use in the product the pH is reduced to a value lower than desired, an alkali, such as sodium hydroxide and/or potassium hydroxide, may be added to raise the pH to the desired range. Likewise, while calcium gluconate has been designated as the primary calcium-bearing compound, it will be understood that other calcium-bearing compounds, such as calcium-lactate, calcium chloride, calcium hydroxide, and the like may be used. The use of calcium chloride is less preferable in the formulation of a food for human consumption since it imparts to the product excessive chloride ions and tends to impart objectionable taste properties within the resultant product.

It has been found in conducting all of the above tests that it is unnecessary to maintain a prolonged holding time after the addition of each of the reagents to the milk. Likewise, the temperatures at which the reactions take place are, within limits, uncritical. For example, the holding time between the addition of the various reagents may be as short as five minutes or less. The holding temperatures may range from a few degrees above the freezing point of the fluid, say in the neighborhood of 35° F., to as high as 150° F. or higher. Conversely, the holding periods may be extended for as long as one hour or more without harmful results, except where the pH of the product is approximately 9.75 or higher during the holding period. In any of these cases the curd-forming properties of the milk were completely destroyed. Other tests involving variations of holding times and temperatures demonstrated that the length of the holding periods did not play an important role in accomplishing the intended purpose. It should be pointed out that the shortened holding periods are economically important in that they mean lower cost with respect to time and labor and increased volume of production with a given amount of processing equipment. The lower temperatures at which the reactions can take place, coupled with the short holding period, are important from the micro-biological aspects since micro-organisms generally grow more rapidly at temperatures ranging from 60° F. to 100° F. than they do at lower temperatures.

The preceding experiments have been given to demonstrate that the curd-forming properties of skimmed milk can be destroyed by the addition of alkali metal citrates or by the addition of a combination of alkali metal hydroxide, citric acid, and alkali metal citrates, in proper amounts, even though the calcium to phosphorus ratio of the milk is raised to within the range of that found in human milk by the augmentation of the calcium content of the milk through the addition of calcium-bearing compounds. This has been accomplished while holding the milk at temperatures ranging from approximately 35° F. to 150° F. Thus, it is possible to produce a liquid milk product having a high calcium to phosphorus ratio and the property of non-curd formation when tested by the present official method of The American Dairy Science Association.

An example is offered in the following operations which illustrates the utility and efficiency of the present invention in the production of a dried milk product on a large scale commercial basis:

9500 lbs. of pasteurized skimmed milk were placed in a vat equipped for heating and mechanical agitation. The milk was brought to a temperature of 90° F. and held at that temperature while being treated with trisodium citrate and calcium gluconate. 50.1 lbs. of anhydrous trisodium citrate dissolved in 25 gals. of water were added to the milk and the mixture was agitated for 45 minutes. 41.7 lbs. of calcium gluconate were added to the milk and agitation was continued for one hour.

A mixture of pure animal and vegetable fats was added to 135 gallons of the treated milk which was then heated to 145° F. and homogenized at 1500 lbs. pressure, in order to form an emulsion of the fats in the milk. The homogenized product was cooled to about 50° F. and added to the rest of the treated skimmed milk which also had been cooled to 50° F. A calculated amount of crystalline lactose was added to the treated milk and dissolved therein, after which the whole was heated at 170° F. for 15 minutes, condensed under partial vacuum to about 42% total solids, and spray dried in a large commercial spray drier. Approximately 2498 lbs. of dried product were recovered from the drier.

The dried product had the following composition:

| | |
|---|---|
| Per cent moisture | 2.03 |
| Per cent protein | 13.74 |
| Per cent fat | 26.96 |
| Per cent ash | 4.12 |
| Per cent lactose (by difference) | 53.15 |
| Per cent calcium | 0.625 |
| Per cent phosphorus | 0.379 |
| Ca/P ratio | 1.65 |

The skimmed milk used in the manufacture of the above batch of product contained, by weight, 0.1282 per cent calcium and 0.1016 per cent phosphorus and accordingly had a calcium to phosphorus ratio of 1.26 as contrasted to a ratio of 1.65 in the product described immediately above.

The dried product obtained by the above operation was reliquefied in water in four concentrations, so that one sample contained 26 grams of powder in 200 ml. of water, the second contained 52 grams of powder in 200 ml. of water, the third sample contained 78 grams of powder in 200 ml. of water, and the last contained 104 grams of powder in 200 ml. of water. All of the reliquefied products were then tested by the standard method for curd formation and it was found that the first three of the four samples were entirely free of curd formation, while the fourth sample revealed no curd formation with the exception of a few particles of undissolved solids appearing upon the walls of the vessel in which the test was made. Likewise, during the above operations, a sample of the liquid skimmed milk containing only added trisodium citrate and calcium gluconate was tested for curd formation and was found to be non-curd forming. Also, the liquid product obtained after the addition of the mixture of fats and crystalline lactose, but prior to the condensing step, was tested and found to be entirely free of curd-forming properties.

It will be noted that the present invention may also be used in the preparation of a concentrated milk product having the desirable characteristics of an increased calcium to phosphorus ratio and non-curd formation. In a particular example, 148 lbs. of skimmed milk were treated first with 382 grams of trisodium citrate dihydrate and then with 280 grams of anhydrous calcium gluconate, the treatment being carried out at 90° F. To a portion of the treated milk were added 11.5 lbs. of a mixture of animal and vegetable fats and the mixture of fats and milk was homogenized in order to form a stable emulsion of the fat in the fluid milk. The portion of the treated milk containing the fats was mixed with the rest of the treated skimmed milk and the whole was raised to a temperature of 170° F. and held at that temperature for 20 minutes. During this time 15.5 lbs. of crystalline lactose were added to the milk and dissolved therein. The heated milk containing the added ingredients was condensed under partial vacuum to a total solids concentration of about 43.5 per cent. The concentrated product was tested for curd formation by the official method and was found to be non-curd forming. The original skimmed milk formed a very firm hard curd when tested by the same method. The calcium to phosphorus ratio in the concentrated product was 1.57 as contrasted to a ratio of 1.24 in the original skimmed milk.

In view of the foregoing, it will be seen that the present invention provides efficient and economical methods for the production of non-curding milk products from cow's milk, which have a substantially increased calcium to phosphorus ratio over that of normal cow's milk, and which approximates that in human milk. As above outlined, the resultant products obtained from the practice of this invention may constitute either a liquid milk product, a concentrated fluid milk product, or a dried milk product which may be supplemented with various nutritional constituents to provide substantially all the elements necessary to obtain a complete food product. The dried milk products and concentrated fluid milk products obtained by such methods are characterized by their freedom from curd formation in a reliquefied form, the same being easily, quickly, and completely dispersible in water to form a stable homogeneous suspension. Further, the products obtained from the present invention provide increased nutritional values, by nature of the supplemented calcium, over and above those possessed by previously known and so-called soft-curd milks or milk products. The advantages arising from the increased nutritional and readily digestible properties of such products will be manifest, particularly with reference to infant and invalid feeding.

While the preceding examples have specified the use of skimmed cow's milk as a particular milk-supplying agent for the present process and products, it will be understood that the use of whole milk, partially skimmed milk, and even mineral-modified or supplemented milks is contemplated without departing from the spirit of the present invention or the scope of the following claims.

We claim:

1. In the preparation of a dried non-curd forming dietary milk product having an increased calcium to phosphorus ratio over that of normal cow's milk, the method which comprises adding to a known quantity of cow's milk having a known calcium to phosphorus ratio an edible compound containing calcium ions sufficient to raise the calcium to phosphorus ratio of the treated milk to a value of from 1.3 to 1, to 2.43 to 1, introducing within the milk a non-toxic compound containing citrate ions sufficient to completely destroy curd-forming properties within the treated milk, adding to the thus treated milk a mixture of animal and vegetable fats, dissolving in the milk crystalline lactose, condensing the milk, and mechanically drying the condensed milk to produce a dried milk product.

2. In the preparation of a mineral modified milk food product, the method which comprises adding to normal cow's milk an edible calcium-bearing compound to increase the calcium to phosphorus ratio of the milk and a second non-toxic compound capable upon ionization of yielding citrate ions in sufficient quantity to destroy curd-forming properties within the milk after the addition of the calcium-bearing compound thereto, the quantity of citrate ions added to the milk being equivalent to at least 0.183% by weight of the milk plus 472% by weight of the calcium added thereto.

3. In the preparation of a mineral modified milk food product, the method which comprises adding to normal cow's milk calcium hydroxide to increase the calcium to phosphorus ratio within the milk and at the same time to increase the pH value of the milk, reacting the thus treated milk with a non-toxic acid to bring the pH value thereof within a range from 6.3 to 6.9, and thereafter adding to the milk a non-toxic alkali metal citrate to destroy curd-forming properties of the treated milk.

4. In the preparation of a non-curd forming, high-calcium milk food product, the method which comprises adding to normal cow's milk calcium hydroxide to increase the calcium to phosphorus ratio within the milk and at the same time to increase the pH value of the milk, reacting the thus treated milk with citric acid to reduce the pH value of the milk to a range of from 6.3 to 6.9 and to partially destroy curd-forming properties of the milk, and adding to the milk a non-toxic alkali metal citrate to completely destroy the curd-forming properties of the milk having the increased calcium to phosphorus ratio.

5. In the treatment of milk, the method which comprises adding to normal cow's milk a plurality of normally edible and non-toxic compounds capable of yielding calcium and citrate ions respectively when introduced into the milk, the added calcium ions producing in the milk a calcium to phosphorus ratio of from 1.3 to 1 to 2.43 to 1, and the added citrate ions serving to destroy curd-forming properties of the milk having added calcium ions.

6. In the preparation of a mineral modified milk food product, the method which comprises introducing within normal cow's milk an edible calcium-bearing compound to raise the calcium to phosphorus ratio in the milk, and adding to the milk a mixture of sodium and potassium citrates to destroy curd-forming properties within the milk having an increased calcium to phosphorus ratio, the percentage of potassium within said mixture of citrates being greater than the percentage of sodium contained therein whereby to decrease the sodium to potassium ratio within the milk.

7. In the preparation of a mineral modified milk food product, the method which comprises adding to normal cow's milk potassium hydroxide to increase the pH value of the milk and to increase the potassium ion concentration within the milk, introducing within the milk an edible substantially phosphorus free compound of calcium to increase the calcium to phosphorus ratio within the milk, reacting the milk with citric acid to bring the pH value within a range of from 6.3 to 6.9 and to partially destroy curd-forming properties within the milk, and thereafter introducing within the milk a mixture of sodium and potassium citrates to completely destroy curd-forming properties within the milk after the introduction of said calcium compound and to obtain in the milk a sodium to potassium ratio less than that originally possessed by the milk.

8. In the preparation of a mineral-modified milk food product, the method which comprises adding to normal cow's milk having a known calcium to phosphorus ratio a phosphorus-free non-toxic calcium compound to increase the ratio of calcium to phosphorus within the milk, and adding to the milk a non-toxic alkali metal citrate to destroy natural curd-forming properties possessed by the milk plus added curd-forming properties imparted to the milk through the addition of calcium thereto.

9. In the preparation of a non-curd forming milk food product having an increased calcium to phosphorus ratio over that of normal cow's milk, the method which comprises adding to a known quantity of normal cow's milk having a known calcium to phosphorus ratio a non-toxic, phosphorus-free calcium-bearing compound capable when added to the milk of yielding a quantity of calcium sufficient to raise the calcium to phosphorus ratio of the milk to a value of from 1.3 to 1, to 2.43 to 1, and separately adding to the milk a non-toxic citrate-bearing compound capable when added to the milk of yielding a quantity of citrate ions equivalent to at least 0.183% by weight of the milk plus 472% by weight of the calcium added thereto, whereby to destroy natural curd-forming properties possessed by the milk plus added curd-forming properties imparted to the milk through the addition of calcium thereto.

10. In the preparation of a mineral-modified non-curd forming milk food product, the method which comprises adding to a known quantity of normal cow's milk having a calcium to phosphorus ratio of less than 1.3 to 1 a quantity of calcium gluconate to raise the calcium to phosphorus ratio of the milk to a value of from 1.3 to 1, to 2.43 to 1, and separately adding to the milk potassium citrate in an amount capable of yielding a quantity of citrate ions equivalent to at least 0.183% by weight of the milk plus 472% by weight of the calcium added thereto, whereby to destroy natural curd-forming properties possessed by the milk plus added curd-forming properties imparted to the milk through the addition of calcium thereto.

11. In the preparation of a mineral-modified non-curd forming milk food product, the method which comprises adding to a known quantity of normal cow's milk having a known calcium to phosphorus ratio a quantity of anhydrous calcium gluconate to bring the ratio of calcium to phosphorus within the milk within a range of from 1.3 to 1, to 2.43 to 1, and separately adding to the milk anhydrous tri-potassium citrate in an amount equivalent to at least 0.296% by weight of the milk plus 71.2% by weight of the anhydrous calcium gluconate added thereto, the anhydrous tri-potassium citrate serving to destroy natural curd-forming properties possessed by the milk alone plus added curd-forming properties imparted to the milk through the addition of calcium gluconate thereto.

12. In the preparation of a dried mineral-modified milk food product, the method which comprises adding to normal cow's milk a non-toxic calcium compound to thereby increase the calcium content of the milk, introducing within the milk a non-toxic compound capable upon ionization of yielding citrate ions whereby to destroy curd-forming properties possessed by the treated milk, adding to the milk a mixture of animal and vegetable fats, dissolving in the milk crystalline lactose, condensing the treated milk, and thereafter drying the condensed milk.

13. A non-curding, dried milk food product comprising a mixture of normal cow's milk, a non-toxic phosphorus-free calcium compound, a non-toxic alkali metal citrate, animal and vegetable fats and lactose.

14. A mineral-modified non-curd forming milk food product comprising a mixture of normal cow's milk, a non-toxic phosphorus-free calcium compound, and sodium and potassium citrates.

15. A non-curding dietary milk food product comprising a mixture of normal cow's milk, a non-toxic, phosphorus-free calcium compound and a non-toxic alkali metal citrate, said mixture having a calcium to phosphorus ratio ranging between 1.3 to 1 and 2.43 to 1.

16. A mineral modified non-curding cow's milk food product having a calcium to phosphorus ratio in excess of that of normal cow's milk, and a sodium to potassium ratio less than that of normal cow's milk, and comprising a mixture of normal cow's milk, a non-toxic phosphorus-free calcium compound, and potassium citrate.

17. In the preparation of a non-curd forming dietary milk product having an increased calcium to phosphorus ratio over that of normal cow's milk, the method which comprises introducing within skimmed cow's milk a non-toxic base in sufficient concentration to bring the pH value of the treated milk within a range of 9.0 to 10.5, adding to the milk an edible non-toxic calcium-bearing compound to increase the calcium content of the milk, reacting the treated milk with an edible non-toxic acid in sufficient concentration to reduce the pH value of the treated milk to between 6.3 and 6.9, and adding to the milk a non-toxic alkali metal citrate in sufficient concentration to completely destroy curd-forming properties within the treated milk.

18. A non-curd forming mineral modified milk food product comprising normal cow's milk having added calcium and citrate ions present therein and having a calcium to phosphorus ratio ranging between 1.3 to 1 and 2.43 to 1, the citrate ions added to the milk being equivalent to at least 0.183% by weight of the milk plus 472% by weight of the calcium added thereto.

LORENZ S. BAUR.
MARIAN PATRICIA GERBER.

REFERENCES CITED

The following references are of record in the file of this patent:

UNITED STATES PATENTS

| Number | Name | Date |
|---|---|---|
| 1,563,891 | Bosworth | Dec. 1, 1925 |

FOREIGN PATENTS

| Number | Country | Date |
|---|---|---|
| 542,846 | Great Britain | Jan. 29, 1942 |

OTHER REFERENCES

Hunziker, O. H.: "Condensed Milk and Milk Powder," 6th edition, March 1946, published by the author, La Grange, Illinois, pages 2, 27, 28, 29, 242, 243, 244.